United States Patent [19]
Reid

[11] 4,080,713
[45] Mar. 28, 1978

[54] METHOD OF JOINING A LADDER RUNG TO A LADDER RAIL

[76] Inventor: Robert John Reid, 50 Transwell Ave., Willowdale, Ontario, Canada

[21] Appl. No.: 679,703

[22] Filed: Apr. 23, 1976

Related U.S. Application Data

[62] Division of Ser. No. 504,178, Sep. 9, 1974, Pat. No. 3,970,400, which is a division of Ser. No. 377,786, Jul. 9, 1973, Pat. No. 3,854,185.

[51] Int. Cl.² ............................................. B23K 31/02
[52] U.S. Cl. .................................... 29/469.5; 29/521; 29/522 R; 29/514
[58] Field of Search ................. 29/155 R, 458, 469.5, 29/514, 521, 522; 182/228; 403/242, 282

[56] References Cited
U.S. PATENT DOCUMENTS

| | | | |
|---|---|---|---|
| 1,163,784 | 12/1915 | Skinner | 29/521 |
| 2,453,504 | 11/1948 | Fleischer | 29/521 UX |
| 3,043,003 | 7/1962 | Lever | 29/514 X |
| 3,168,938 | 2/1965 | Shaver | 182/228 |
| 3,232,378 | 2/1966 | Larson | 182/228 X |
| 3,343,252 | 9/1967 | Reesor | 29/458 |
| 3,350,124 | 10/1967 | Husted | 29/521 X |
| 3,526,420 | 9/1970 | Brancaleone | 29/521 |

Primary Examiner—Charlie T. Moon

[57] ABSTRACT

A method of forming a structural joint between a first and a second rigid element, the first element having at least one flange extending from a face thereof and having an outer end, the second element having at least one elongate groove which is substantially arcuate in cross-section provided on a face thereof, each groove having opposed edges which define an elongate opening of a dimension to permit entry of a flange into the groove, comprises placing the outer end of at least one flange into the elongate opening of the at least one groove. Then by applying sufficient external force to the first and second elements, relative movement between the elements results and the distance between the opposing faces thereof is decreased, the flange being deformed within the groove to form a portion of a coil therein having a width which is greater than the width of the elongate opening. The degree of coiling of the flange within the groove may be varied along the length of the joint. This method may be used to join a ladder rung to a ladder rail.

A structural joint between a first and a second element when formed by the above method.

3 Claims, 10 Drawing Figures

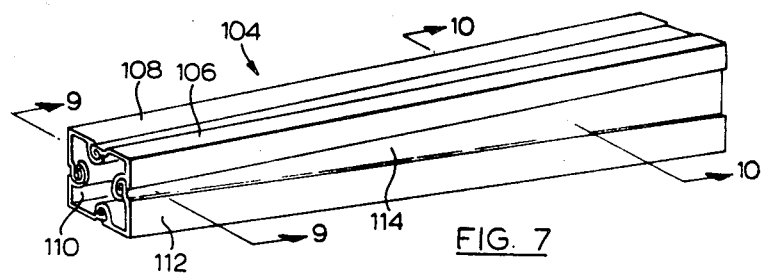
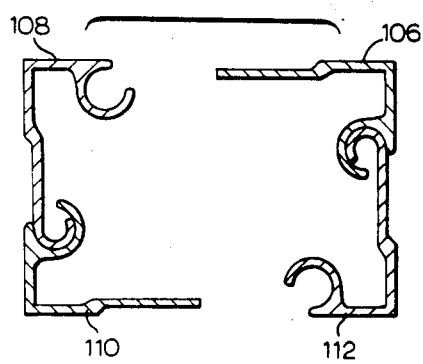
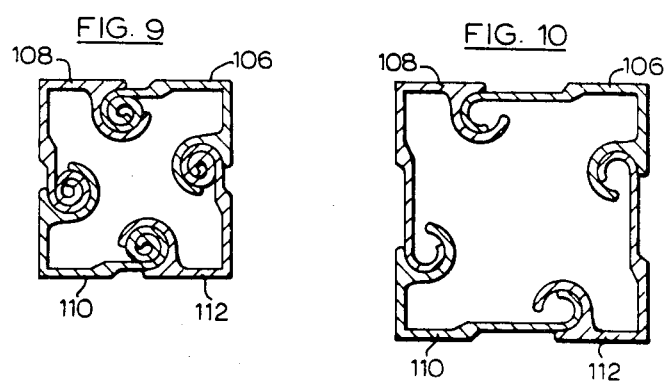
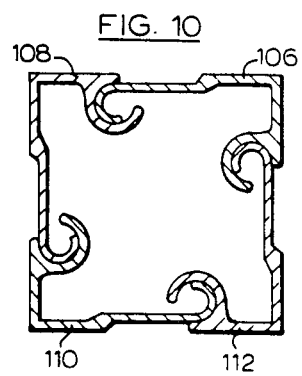

METHOD OF JOINING A LADDER RUNG TO A LADDER RAIL

This is a division, of application Ser. No. 504,178 filed Sept. 9, 1974, now Pat. No. 3,970,400, which is a division of application Ser. No. 377,786 filed July 9, 1973, now U.S. Pat. No. 3,854,185.

FIELD OF INVENTION

This invention relates to structural joints and to a method of forming such a joint between two elements.

BACKGROUND OF THE INVENTION

Procedures commonly used in forming a press-fitted structural joint between two elements usually involve a number of pressing operations prior to the forming of the structural joint. This additional handling of the elements before they are joined may result in added manufacturing costs.

The method of forming a structural joint according to this invention overcomes this problem by forming a simply constructed joint which securely retains two elements in connected relationship. The elements to be joined are characterized in that the first element has at least one flange extending from a face thereof where each flange has an outer end. The second element has at least one elongate groove which is substantially arcuate in cross-section and is provided on a face thereof, each of the grooves having opposed edges which define an elongate opening of a dimension to permit entry of the flange into the groove. The outer end of each of the flanges is placed into the elongate opening of a respective groove, then a sufficient external force is applied to at least one of the first and second elements to cause relative movement between the elements so as to decrease the distance between the opposing faces thereof. As the distance between the opposing faces is decreasing, each flange is deformed within the respective groove to form at least a portion of a coil therein. Once the flange has been deformed within the groove to form the desired degree of coiling within the groove so that the width of the coil is greater than the width of the elongate opening, the external force is removed. This results in a structural joint between the two elements where the flange of the first element is coiled within the groove of the second element to retain the elements in connected relationship.

This method may be adapted to join any two desired pieces of material or to join the edges of a blank piece of material thereby forming a hollow cylinder. This method has many fields of application such as being used to join a ladder rung to a ladder rail. Another is in the joining of at least two elements together, the degree of coiling the flange within the groove being varied along the length of the structural joint to form a taper between opposing faces of the elements being joined. The taper along the joint may be useful in forming tapered columns and the like.

SUMMARY OF THE INVENTION

It is therefore an object of the invention to provide a method of forming a structural joint between two elements.

It is a further object of the invention to provide a method of forming a structural joint which involves very few pressing or forming operations.

It is another object of the invention to provide a method of joining a ladder rung to a ladder rail.

It is yet another object of the invention to provide a method of joining two elements together where the distance between the faces being joined is tapered.

BRIEF DESCRIPTION OF THE DRAWINGS

These and other objects, features and advantages of the invention are discussed in more detail hereinafter, in association with the accompanying drawings, in which:

FIG. 7 is a perspective view of a tapered column consisting of four members where the members are joined according to the method of this invention.

FIG. 8 shows an intermediate step in forming a column of FIG. 7.

FIG. 9 is a cross-sectional view of a column of FIG. 7 along the lines 9—9.

FIG. 10 is a cross-sectional view of the column of FIG. 7 along the lines 10—10.

DETAILED DESCRIPTION OF THE PREFERRED EMBODIMENTS

Figure 1:
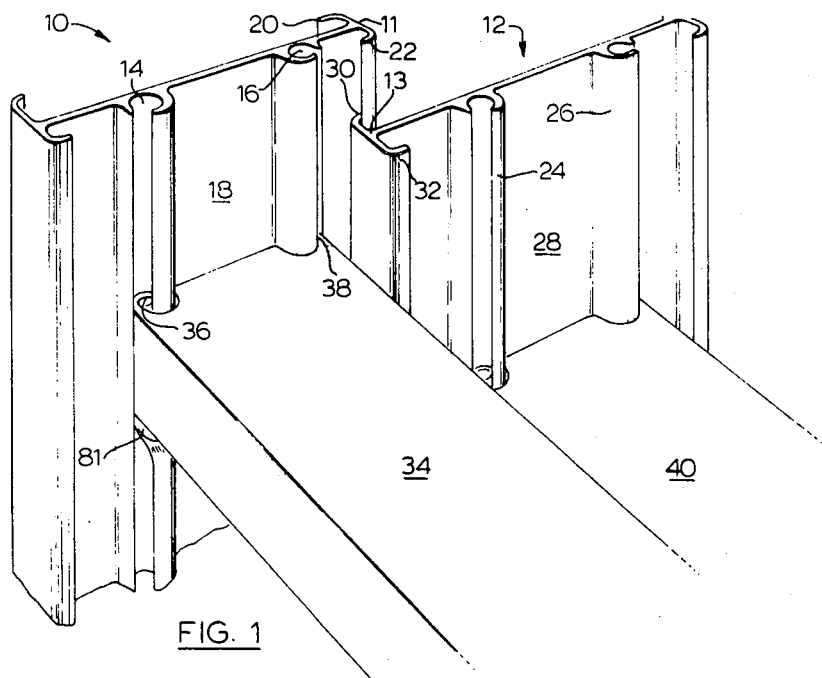
FIG. 1 is a perspective view of a section of an extension ladder where each rung is joined to the respective rail by the method according to this invention.

A structural joint as formed between two elements according to the method of this invention, is shown as being used to join a ladder rung to a ladder rail in FIG. 1. Ladder rail sections 10 and 12 have identical cross-sections as formed by extruding an aluminum alloy common to aluminum ladder construction. Rail 10 has two parallel grooves 14 and 16 disposed on an inner face 18 thereof and at each side flange 11 of the rail 10, there are extruded lips 20 and 22. Similarly on rail 12 there are extruded grooves 24 and 26 on a face 28 of rail 12 and, at each side flange 13 of rail 12, there are extruded lips 30 and 32. Rung 34 is joined to rail 10 by flanges 36 and 38 being coiled within grooves 14 and 16 respectively. Similarly rung 40 is connected to rail 12.

The extension ladder is assembled by sliding lip 30 of rail 12 over lip 22 of rail 10, where the outside surface 42 of rail 12 slides along a back side surface of rung 34.

Figure 2:
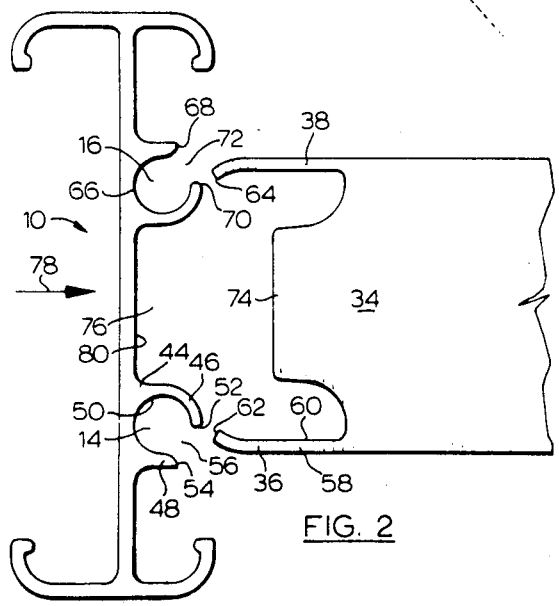
FIG. 2 is a top view showing a ladder rung and a ladder rail prior to their being joined.
Figure 3:
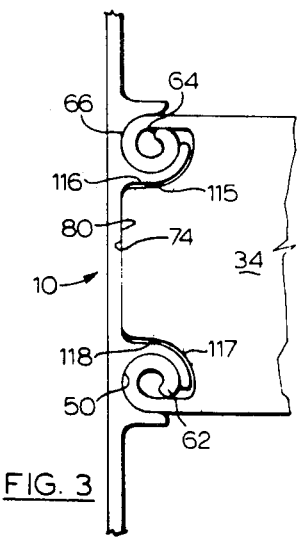
FIG. 3 is a partial view of the elements shown in FIG. 2 where the ladder rung and the ladder rail are joined together.

Referring to FIGS. 2 and 3, rung 34 is shown prior to its being pressed towards rail 10 and after it is joined to rail 10. Considering groove 14 as formed in body portion 44 having lips 46 and 48, the inner face 50 of the groove is substantially arcuate where edges 52 and 54 define an elongate opening 56 which runs the length of groove 14. Flange 36 which is coiled in groove 14 has an outer surface 58, an inner surface 60 and an outer end 62. Proximate the outer end 62, the flange may be bent with a curvature in the outer face 58 somewhat identical to the curvature of groove 14 at the position where the outer face 58 initially contacts the inner arcuate face 50 when flange 36 is placed within groove 14.

Similarly, flange 38 is formed with an outer end 64 which may be bent inwardly with the same degree of curvature. Groove 16 has an inner arcuate face 66 and terminates at edges 68 and 70 which define an elongate opening 72 running the length of groove 16. To ensure that flanges 36 and 38 are easily placed in grooves 14 and 16, the distance between edges 52 and 70 is less than the distance between the inner edges of the outer ends 62 and 64. The length of either grooves 14 or 16 need not run the length of the respective ladder rail, in that depending on proper positioning, there may be a plurality of aligned grooves, each groove having a height at least equal to that of a flange.

As shown in FIG. 2, flange 36 travels along a line which is offset from the longitudinal axis of groove 14 where the positioning of opening 56 only permits the offset entry when the flange moves in from the position shown. However, it is understood that other combinations of opening position and flange point of entry may be used to effect the desired deformation of the flange within the corresponding groove.

Rung 34 may be made of a malleable metal such as an aluminum alloy common to aluminum ladder construction and may be tubular in cross-section. Flanges 36 and 38 may be formed in each end of rung 34 by a number of conventional machining methods such as milling an end of a tubular blank portion to form the configuration as shown in FIG. 2. Subsequently, the outer end of each flange may be bent accordingly. In this particular application, the end of rung 34 is machined so that the portion of the rung between flanges 36 and 38 corresponds in configuration with that of the inner surface 80 of the rail between grooves 14 and 16 so that extended portion 74 of rung 34 fits neatly in the recessed portion 76 between grooves 14 and 16.

In joining the rung 34 to rail 10, rung 34 may be held in a stationary position and rail 10 aligned with rung 34 so that flanges 36 and 38 are inserted into grooves 14 and 16 through openings 56 and 72 respectively, as rail 10 is moved in the direction of arrow 78. An external force of sufficient magnitude may be applied to rail 10 to continue this movement so as to deform flanges 36 and 38 within grooves 14 and 16 respectively. In considering flange 36, this deformation occurs as the outer face 58 contacts the inner arcuate face 50 of groove 14 so that as rail 10 is moved in the direction of arrow 78, the outer end 62 of the rung travels around the inner arcuate face 50 of the rail to form at least a portion of a coil. This movement of the outer end 62 defines a locus along which the outer end may traverse more than 180° as shown in FIG. 3. The axis of the coil formed due to the bending of flange 36 may be perpendicular to an axis along which the external force is directed, namely arrow 78. When rung 34 is in secured position, extended portion 74 abuts against the inner surface 80 to act as a stop and thereby control the degree of coiling of each flange in the respective groove. Similarly with flange 38, the outer end 64 has moved along the inner arcuate face 66 and has traversed more than 180°.

Both rail 10 and rung 34 should be formed of relatively rigid material so that during the pressing of rung 34 against rail 10, neither of these elements collapse. It is understood that in the milling of the blank piece of rung 34, the thickness of flanges 36 and 38 is such to permit deformation of these flanges within the respective grooves during the pressing operation.

The outer end 62 of flange 36 need not necessarily be bent as shown in FIG. 2 because the flange 36 in its straight form after the milling operation may be inserted in groove 14 and due to the arcuate configuration of groove 14, the outer end 62 will follow around the inner face 50. Lubricants and the like may be used to assist this operation and further assistance may be found by rounding the outer edge of outer end 62. In addition, the outer rounded edge of end 62 may be of assistance in further coiling of the flange 36 as the outer end travels around so that the outer face 58 contacts the inner face 60. In case flanges 36 and 38 do not exactly line up with grooves 14 and 16, edges 54 and 68 of the respective grooves may be rounded to additionally assist the placement of the flanges within the grooves.

Due to the inherent resiliency of each flange when it is deformed within a corresponding groove a binding force may be exerted outwardly on the inner arcuate face of each groove. As a result, the flange tends to remain within the groove in the position in which it is placed and usually there is very little slippage of the flange along the length of the groove if a downward force is placed on the rung. Although the binding force exerted by the coiled flange would be dependent upon the degree of coiling and the type of material from which the flange is made. To ensure that the flange does not move along the length of the rung, a detent may be formed in the sides of each groove to decrease the cross-sectional area of each groove. These detents may be formed below and/or above the rung. As shown in FIG. 1, a detent 81 is formed below flange 36 and similarly detents may be formed below the remaining flanges of rungs 34 and 40 to ensure the safety of a person using the ladder.

Resistance to this type of movement may be achieved by various ways and means, such as forming a tight fit between faces 115 and 116 and correspondingly between faces 117 and 118 as designated in FIG. 3 by milling each end of rung 34 so that the distance between faces 116 and 118 is equal to or less than the distance between faces 115 and 117. Other ways of increasing torsional resistance include forming detents not only below each rung, but also directly above each rung; and adhesive material may be employed to retain the flanges in the desired position within the grooves where the adhesive material may act as a lubricant during the pressing of the structural joint and then set-up and secure the joint once it has been formed.

From this detailed description of a preferred use of the method of forming a structural joint according to this invention, it is apparent that this type of structural joint has many uses and that any member or element having a flange of malleable material extending from a face thereof may be placed in an arcuate groove of another member or element and by pressing the two elements or members together, deform the flange within the groove to coil the flange and thereby retain the two members in connected relationship because the width of the portion of the coil formed within the groove is greater than the width of the opening of the groove.

Figure 4:
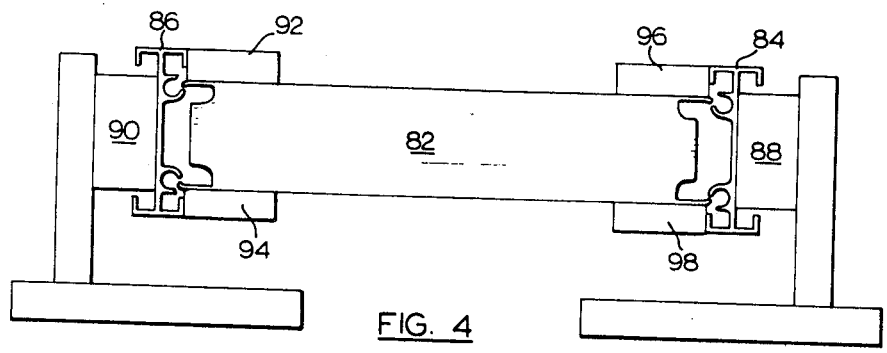
FIGS. 4, 5 and 6 schematically show a preferred manner of pressing a ladder rung between two ladder rails to form structural joints according to this invention.
Figure 5:
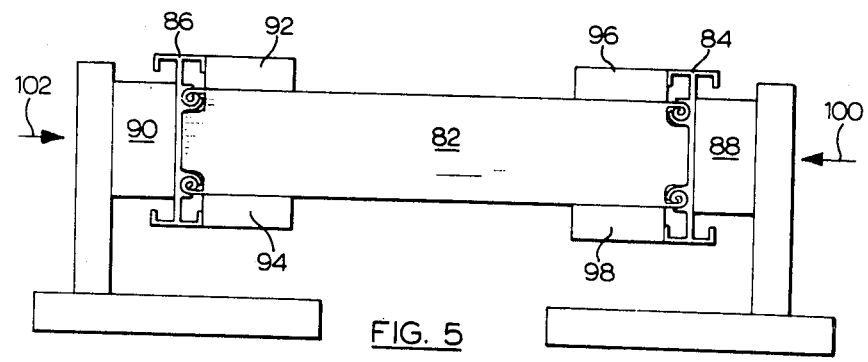
Figure 6:
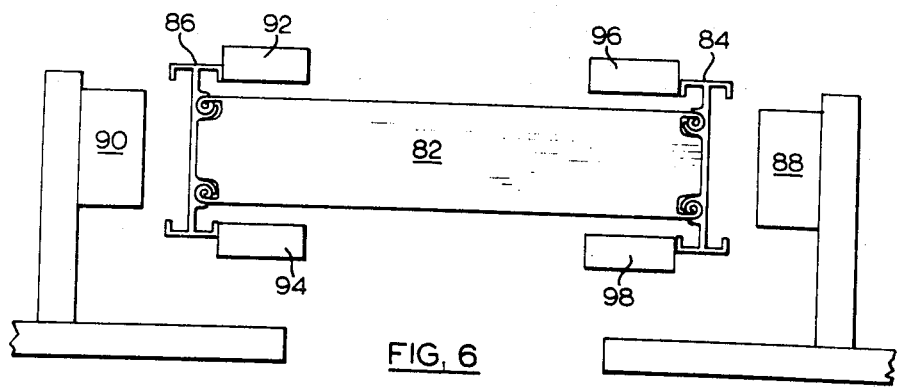

FIGS. 4, 5 and 6 illustrate various steps which may be used to press a ladder rung 82 between two ladder rails 84 and 86. The flanges at each end of ladder rung 82 are lined up with the respective grooves in rails 84 and 86. The outer surface of each ladder rail is acted upon by press blocks 88 and 90 and press blocks 92, 94, 96 and 98 are provided at the corresponding outer flange faces to prevent any bulging outwardly or buckling of the flange as it is being coiled within the respective groove. In FIG. 5, press blocks 88 and 90 are moved towards each other in the direction of arrows 100 and 102, thereby decreasing the distance between rails 84 and 86. As this takes place, each flange is coiled within the respective groove as shown and each of blocks 92, 94, 96 and 98 move inwardly along the sides of rung 82 to ensure that each flange moves into the groove smoothly without any undesirable buckling during the pressing operation.

FIG. 6 shows all of the press blocks in retracted position to permit removal of ladder rung 82 as it is joined to rails 84 and 86.

FIG. 7 illustrates a tapered column 104 consisting of four identical elements 106, 108, 110 and 112 joined together according to the method of this invention. There are therefore four structural joints between the four elements and in considering structural joint 114 between elements 106 and 112, it is apparent that the joint is tapered along the length of the column 104. This is a further desired feature of a preferred embodiment in that the degree of coiling of the flange within a groove may be varied along the length of the structural joint between two elements. As a result, a tapered joint is obtained. A further advantage of the invention is therefore realized in that an exact machining of the length of the flange and the sides of the grooves is not required because the flange may coil within the groove to an extent which permits machining differences from optimum in the length of the flange and the cross-sectional configuration of the groove. Therefore the grooves may be formed quite satisfactorily from an extrusion process and similarly, the flanges may be also extruded if the element to be joined so permits.

FIG. 8 shows an intermediate step in the forming of column 104 where elements 106 and 112 are joined and elements 108 and 110 are also joined to form two channel portions. The flanges of elements 106 and 110 are then aligned with the grooves of elements 108 and 112 and by pressing the channel portions towards each other the completed column is formed as illustrated in FIG. 7.

FIGS. 9 and 10 are cross-sections of column 104 along lines 9—9 and 10—10 respectively to show the variation in the degree of coiling of the flanges within the grooves along the length of the column. This variation in the degree of coiling may be attained by arranging press blocks which are used to press the elements in a manner so that the distance between the blocks along their length is essentially identical to the taper desired along the joint. As a result, the degree of coiling of the flange of member 106 in the groove of member 108 as shown in FIG. 9, is much greater than that shown in FIG. 10. In addition, the degree of coiling of the flanges shown in FIG. 10 is very close to the minimum amount required in that a lesser degree of coiling would permit removal of any one of the flanges from the respective groove.

It can therefore be seen from the preferred embodiments that a structural joint of this nature is of simple construction and requires very little forming or pressing to be completed.

While various embodiments of the invention have been illustrated and described, it will be understood that variations therein may be made as will be apparent to those skilled in the art without departing from the spirit of the invention or scope of the appended claims.

I claim:

1. A method of joining a ladder rung to a ladder rail where each end of said ladder rung is provided with outwardly extended flanges of essentially uniform thickness which are inserted into arcuate shaped spaced-apart grooves provided on inner surfaces of said ladder rails, pressure being applied to move said rails towards each other to thereby deform the flanges of the rung in the grooves of the rails to form at least a portion of coil of each flange in each groove, to thereby secure the rung to the rail; said method being characterized in providing two raised portions extending the length of and on the inside surface of each ladder rail where an elongate groove, arcuate in cross-section, is located in and extends along each said raised portion, each groove having opposed edges which define an elongate opening of a dimension to permit entry of the flange of a rung in a corresponding groove of a rail, each end portion of the ladder rung being cut away in a manner to provide two outwardly extending flanges, of essentially uniform thickness integral with the side walls of the ladder rung a stop portion being provided intermediate said flanges, the rung being recessed on each side of and back of said stop portion, positioning a plurality of so formed ladder rungs between two so formed ladder rails with the flanges of the rung ends being aligned with the corresponding grooves, so that each flange enters the groove along a path offset from the central axis of said groove and applying sufficient external force to said rails to move them towards each other to thereby deform said flanges within said grooves to form at least a portion of a coil of a flange in each groove, the width of the coiled portion being greater than the width of said elongate opening of the groove, said stop portion on each rung abutting the inner surfaces of said opposing rails to limit the extent to which the flanges are inserted into the corresponding grooves and to determine the distance between the ladder rails when secured to the ladder rungs, the recessed portions in each rung on each side of the stop portion accommodating a section of the raised portions on each ladder rail.

2. A method of claim 1 further characterized in providing an indentation below each rung in one or more sides of the groove to decrease the cross-sectional area of the groove.

3. A method of claim 1 further characterized in providing an adhesive on the flanges of the rungs prior to insertion and deformation of the flanges within the grooves.

* * * * *